(12) United States Patent
Rashkovskiy

(10) Patent No.: US 8,776,118 B1
(45) Date of Patent: Jul. 8, 2014

(54) USING WEB BASED INFORMATION TO SELECT TELEVISION PROGRAMS

(75) Inventor: Oleg B. Rashkovskiy, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 1119 days.

(21) Appl. No.: 09/584,508

(22) Filed: May 31, 2000

Related U.S. Application Data

(63) Continuation-in-part of application No. 09/561,054, filed on Apr. 28, 2000, now Pat. No. 7,162,700.

(51) Int. Cl.
*H04N 5/445* (2011.01)
*H04N 21/235* (2011.01)
*H04N 21/236* (2011.01)
*H04N 21/435* (2011.01)

(52) U.S. Cl.
CPC ......... *H04N 21/2355* (2013.01); *H04N 21/236* (2013.01); *H04N 21/4355* (2013.01)
USPC .................... 725/38; 725/36; 725/51; 725/58; 725/110; 725/112

(58) Field of Classification Search
CPC ............ H04N 21/236; H04N 21/2355; H04N 21/4355
USPC .................... 725/38, 39, 51, 58, 110, 112, 36; 715/500.1, 51, 513, 516
See application file for complete search history.

(56) References Cited

U.S. PATENT DOCUMENTS

| | | | | |
|---|---|---|---|---|
| 5,664,133 A | * | 9/1997 | Malamud et al. | 715/816 |
| 5,982,445 A | * | 11/1999 | Eyer et al. | 725/110 |
| 6,018,764 A | * | 1/2000 | Field et al. | 709/217 |
| 6,018,768 A | | 1/2000 | Ullman et al. | 709/128 |
| 6,025,837 A | | 2/2000 | Matthews, III et al. | |
| 6,081,830 A | * | 6/2000 | Schindler | 709/204 |
| 6,205,485 B1 | * | 3/2001 | Kikinis | 709/231 |
| 6,338,059 B1 | * | 1/2002 | Fields et al. | 707/4 |
| 6,388,714 B1 | | 5/2002 | Schein et al. | 348/563 |
| 6,442,755 B1 | * | 8/2002 | Lemmons et al. | 725/47 |
| 6,445,398 B1 | | 9/2002 | Gerba et al. | 345/721 |
| 6,493,006 B1 | * | 12/2002 | Gourdol et al. | 715/825 |
| 6,651,084 B1 | * | 11/2003 | Kelley et al. | 709/231 |

(Continued)

FOREIGN PATENT DOCUMENTS

| | | |
|---|---|---|
| EP | 0 834 798 A2 | 4/1998 |
| JP | 2000-307993 | 11/2000 |

(Continued)

OTHER PUBLICATIONS

Newton, Harry, "Newton's Telecom Dictionary, 13th Edition", Jan. 1998, p. 339.*

(Continued)

*Primary Examiner* — Pankaj Kumar
*Assistant Examiner* — Sahar Baig
(74) *Attorney, Agent, or Firm* — Trop, Pruner & Hu, P.C.

(57) ABSTRACT

Variables incorporated into a hypertext markup language program guide enable location of hypertext elements. Once the variable is located, the information contained within the identified hypertext element may be used to tune to a particular channel.

31 Claims, 8 Drawing Sheets

(56) References Cited

U.S. PATENT DOCUMENTS

| | | | |
|---|---|---|---|
| 6,738,982 B1 * | 5/2004 | Jerding | 725/112 |
| 6,757,707 B1 * | 6/2004 | Houghton et al. | 709/203 |
| 6,785,902 B1 * | 8/2004 | Zigmond et al. | 725/38 |
| 6,802,061 B1 * | 10/2004 | Parthasarathy et al. | 717/173 |
| 2002/0027562 A1 * | 3/2002 | Kimble et al. | 345/629 |
| 2002/0069411 A1 * | 6/2002 | Rainville et al. | 725/37 |

FOREIGN PATENT DOCUMENTS

| | | | | |
|---|---|---|---|---|
| WO | WO 98/26584 | | 6/1998 | |
| WO | WO 9826584 A1 * | 6/1998 | | H04N 5/445 |
| WO | WO 99/04561 | | 1/1999 | |
| WO | WO 9927690 A1 * | 6/1999 | | H03J 5/02 |
| WO | WO 00/02385 | | 1/2000 | |
| WO | WO 00/08855 | | 2/2000 | |
| WO | WO 00 24195 | | 4/2000 | |
| WO | WO 01/15444 A1 | | 3/2001 | |
| WO | WO 0140938 A2 * | 6/2001 | | G06F 9/46 |

OTHER PUBLICATIONS

"XML Linking Language (XLink)", W3C Working Draft, (Jan. 19, 2000).*

Nguyen, U.S. Appl. No. 60/182,822, filed Feb. 16, 2000.*

Kimble et al., U.S. Appl. No. 60/180,085, filed Feb. 3, 2000.*

Official Netscape Communicator Book, Windows Edition. Phil James Ventana Communications Group © 1997, pp. 78, 79, 338-343 and 512-515.

Ochiai et al., *Implementation of HomeServer Integrated with Internet*, Collected Papers (3) for Discourses at 57th (latter term of 1998) National Convention, Oct. 7, 1998, pp. 3-157 to 158).

* cited by examiner

Yahoo! TV Coverage: Listings

Yahoo! TV Listings - Pacific Timezone - Change Lineup

| Tue 01/18 ▼ | Now ▼ | All Categories ▼ | All Channels ▼ | OK | | Yahoo! TV Home |
|---|---|---|---|---|---|---|
| ← | 8pm | 8:30pm | 9pm | 9:30pm | 10pm | 10:30pm | → |
| ABC | Who Wants to Be a Millionaire | | Dharma & Greg | SportNight | NYPD Blue | | ABC |
| CBS | JAG | | 60 Minutes II | | Judging Amy | | CBS |
| FOX | That '70s Show | Malcolme & the Middle Rerun | Ally McBeal | | Local Programming | | FOX |
| NBC | Just Shoot Me Rerun | 3rd Rock From the Sun Rerun | Will & Grace | Victoria's Closet | Dateline NBC | | NBC |
| PBS | Nova Rerun | | The American Experience Rerun | | | Local Programming | PBS |
| UPN | I Dare You! The Ultimate Challenge Rerun | | The Parkers Rerun | | Local Programming | | UPN |
| WB | Buffy the Vampire Slayer | | Angel | | Local Programming | | WB |
| AMC | Lady in a Cage (1964) | | | Filmmakers | | Brute Force (1947) *** (NR) | AMC |
| ARTS | Law & Order | | Biography | | Investigative Reports | | ARTS |

FIG. 2

USING WEB BASED INFORMATION TO SELECT TELEVISION PROGRAMS

This application is a continuation-in-part of application Ser. No. 09/561,054 filed Apr. 28, 2000 now U.S. Pat. No. 7,162,700.

BACKGROUND

This invention relates generally to controlling television receivers and particularly to selecting channels for viewing.

Program guides may be offered on a variety of Internet web sites. These program guides include a grid displaying a series of time listings and various networks or channel listings. A user selecting a particular time can determine what programs are available on various channels.

A set-top box provides a television receiver coupled to a processor-based system. The processor-based system may sit on top of the television receiver. The set-top box operates with an electronic programming guide that may be provided by a service provider. Those electronic programming guides allow the user, through mouse click type operations, to select various programs for viewing.

However, the development, for each locality, of the electronic program guide by the service provider involves a considerable amount of effort. Moreover, the service provider must continually provide new programming guides by accessing the information from the content providers such as the television networks.

Unfortunately, it is not possible to use the already existent program guides available on the Internet to automatically select a particular program for viewing. There is generally no way to utilize the information contained in the hypertext mark-up language (HTML) document in a web based programming guide to actuate a separate application, such as a tuner application, on a processor-based system controlling a television receiver. Thus, while the channel and time information is present on the Internet, there is no way to provide the information in the HTML format to an application, that automatically tunes television programs for viewing.

Thus, there is a need for a way to use Internet-based television program guides to control channel and program selection on processor-based systems.

BRIEF DESCRIPTION OF THE DRAWINGS

FIG. 2 is a graphical user interface of a conventional web page;

DETAILED DESCRIPTION

Figure 1:
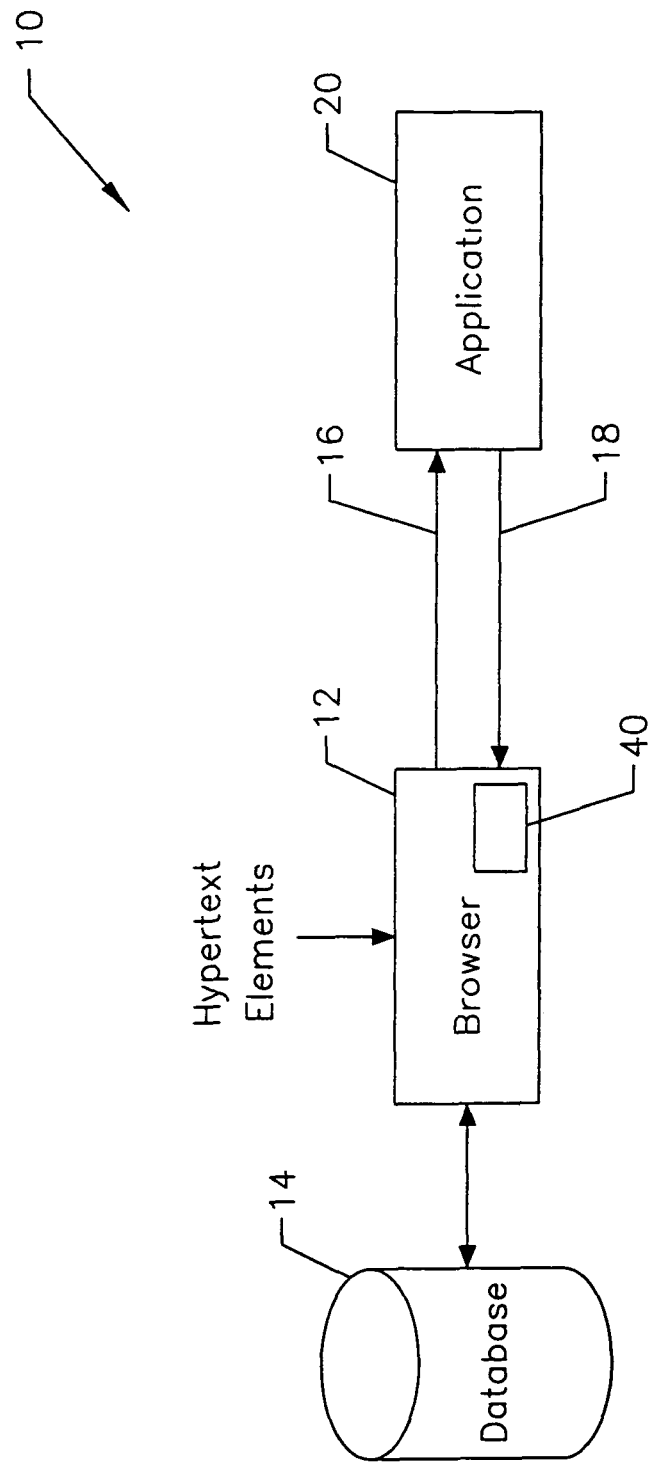
FIG. 1 is a block diagram of one embodiment of the present invention.

Referring to FIG. 1, a processor-based system 10 may use a browser 12 to access hypertext elements. Hypertext elements are the combination of a set of tags, any content contained between the tags and any attributes the tags may have. Hypertext elements may be nested, one within the other. Hypertext elements may exist in various markup languages including HTML, XML (which is a shorthand for Extensible Markup Language) and Standard Generalized Markup Language (SGML).

Standards for markup languages are promulgated by the World Wide Web Consortium (W3C). One such standard is the XHTML 1.0: The Extensible Hypertext Markup Language working draft dated 24 Nov. of 1995 and available from the World Wide Web Consortium (W3C), Massachusetts Institute of Technology, Cambridge, Mass. 02139. Standards for the Wireless Markup Language (WML) for use with cellular telephones are promulgated by the Wireless Application Protocol (WAP) Forum, Ltd. Reading, RG 1-3 BD, United Kingdom.

An "element" is defined by the W3C XHTML 1.0 working draft as a document structuring unit declared in a document type definition. The element's content model is defined in the document type definition and additional semantics may be defined in the prose description of the element. A document type definition (DTD) is a collection of XML declarations that define the legal structure, elements and attributes that are available for use in a document that complies with the DTD.

A "tag" is code that identifies an element in a document for purposes of formatting, indexing and linking information in the documents. In HTML and SGML, a tag is a pair of angle brackets that contain one or more letters or numbers. Usually one pair of angle brackets is placed before and after an element.

In XML for example, any type of data can be given a predetermined form and structure. In XML the tags are user definable. Thus, in one embodiment of the invention, tags may be defined to facilitate the location of particular types of data, such as television program times and channels within markup language documents. Once the data may be located, it may then be transferred to data structures associated with a variety of applications, such as a tuner application, that use television program data.

Hypertext elements are used by the browser to display a hypertext document as a graphical user interface on a processor-based system's display. The browser 12 may be coupled to a database 14 which contains information, for example, about how the markup language works. Software 40 may be included within the browser for purposes to be explained hereinafter.

On the same processor-based system 10 including the browser 12, a tuner application 20 may also be available. The application 20 tunes a television receiver to a selected program for viewing or recording.

The application 20 needs specific information to fulfill requests from the user. The application 20 may make requests 18 for that information and may receive information 16 in return. For example, the tuner application 20 may extract time and channel information from a web page displayed by the browser 12. Thus, the application 20 may provide the information 18 which identifies the hypertext elements of interest and information 16 associated with the identified hypertext elements may be returned to the application 20.

In one embodiment of the present invention, a database may be created with associations between hypertext elements such as metadata, XHTML modules or the like, and applications registered with the browser 12. These applications support the hypertext elements as input data.

The hypertext markup language may be written in a way to code, within hypertext elements, variables that may be identified by the browser 12 in response to a request from an application 20. Thus, by incorporating variables for program names, channels, and times, as standard variables, a tuner application 20, installed on the system 10, recognizes the data format associated with that variable. The application can use the value of the variable as input data. In this way, the application 20 may query the browser 12 to identify information useful by the application 20.

An application 20 can choose a particular variable encoded within the markup language and information associated with that variable may be extracted from a web page and stored in a data structure associated with the application 20. This may be done by simply mouse clicking on the information of interest on the web page in one embodiment.

As shown in FIG. 2, the user may align the cursor 28 over the program information 26 in the program guide web page 22. The web page 22 displays times across the horizontal axis and channel information along the vertical axis. Each network designation such as "ABC" may be correlated by the application 20 to an appropriate local channel. Thus, each program is indicated by a block 24 that corresponds to time and channel information.

Suppose the user wants to watch the program illustrated in the block 24 from the web page 22. The user may mouse click on that block 24 on the web page 22. The web page's 22 time and channel information for that block (ABC, 8 pm to 9 pm) is automatically extracted from the web page 22 and incorporated into a data structure associated with the tuner application 20. Again, this extraction is done in software that locates predefined hypertext elements identified within the markup language code.

Figure 3:
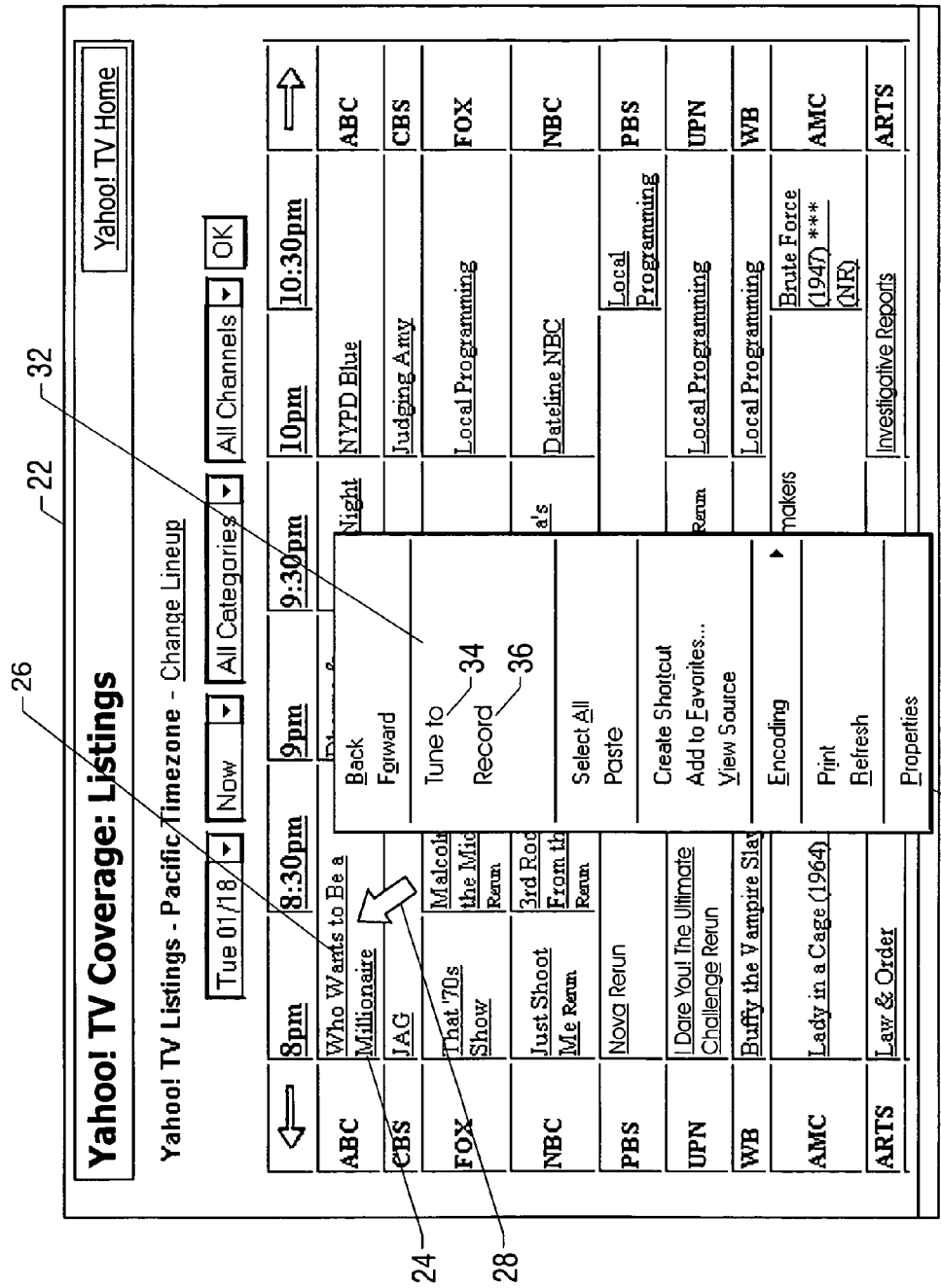
FIG. 3 is a graphical user interface used in accordance with one embodiment of the present invention.

Referring to FIG. 3, when the user mouse clicks on the program block 24 using the cursor 28, a pop-up menu 30 appears in one embodiment of the invention. For example, when the user operates the right mouse button, the menu 30 may provide the user with a number of options in addition to those options conventionally displayed in response to our right mouse click. For example, the pop-up menu 30 may provide icons such as back, select all, create a shortcut, add to favorites, view source, and refresh as well as new selectable icons, "tune to" 34 and "record" 36. Selecting the tune to icon 34 causes the selected program to be automatically tuned and displayed. Selectively, the record icon 36 causes the selected program to be automatically tuned and recorded.

Each of the icons 34 and 36 facilitates selection of a particular application 20 resident on the system, as the destination for the information extracted from a web page. The icons 34 and 36 are added to the pop-up menu 30 when the application 20 associated with each icon registers with the browser 12.

Figure 4:
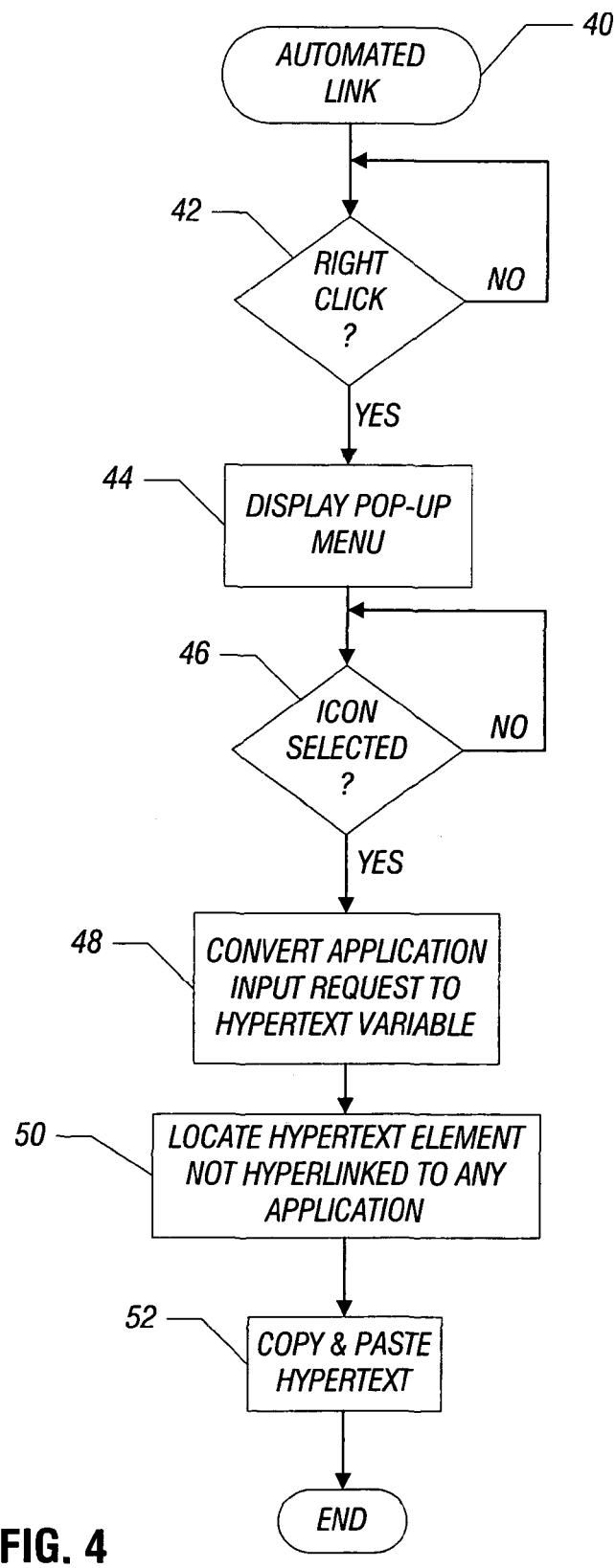
FIG. 4 is a flow chart for software in accordance with one embodiment of the present invention.

Referring next to FIG. 4, the software 40, in accordance with one embodiment of the present invention, may be a separate application which is loaded on the same processor-based system 10 as the browser 12 and the application 20. Alternatively, the software 40 may be incorporated into the browser 12 software as supplied by the browser distributor or subsequently plugged into the browser 12.

Initially, the software 40 may detect a right mouse click indicator, as indicated in diamond 42 in one embodiment. Once received, a pop-up menu 30 may displayed as indicated in block 44. Next, an icon 34 or 36 may be selected by mouse clicking as indicated in diamond 46. A hypertext variable corresponding to a tag is identified as indicated in block 48. The hypertext element associated with the variable is then located within the web document as indicated in block 50. The corresponding subject matter contained within the hypertext element may be used in the application 20. For example, the element may be automatically searched for program title, time and channel information which is copied and pasted into an application 20, as indicated in block 52.

Figure 5:
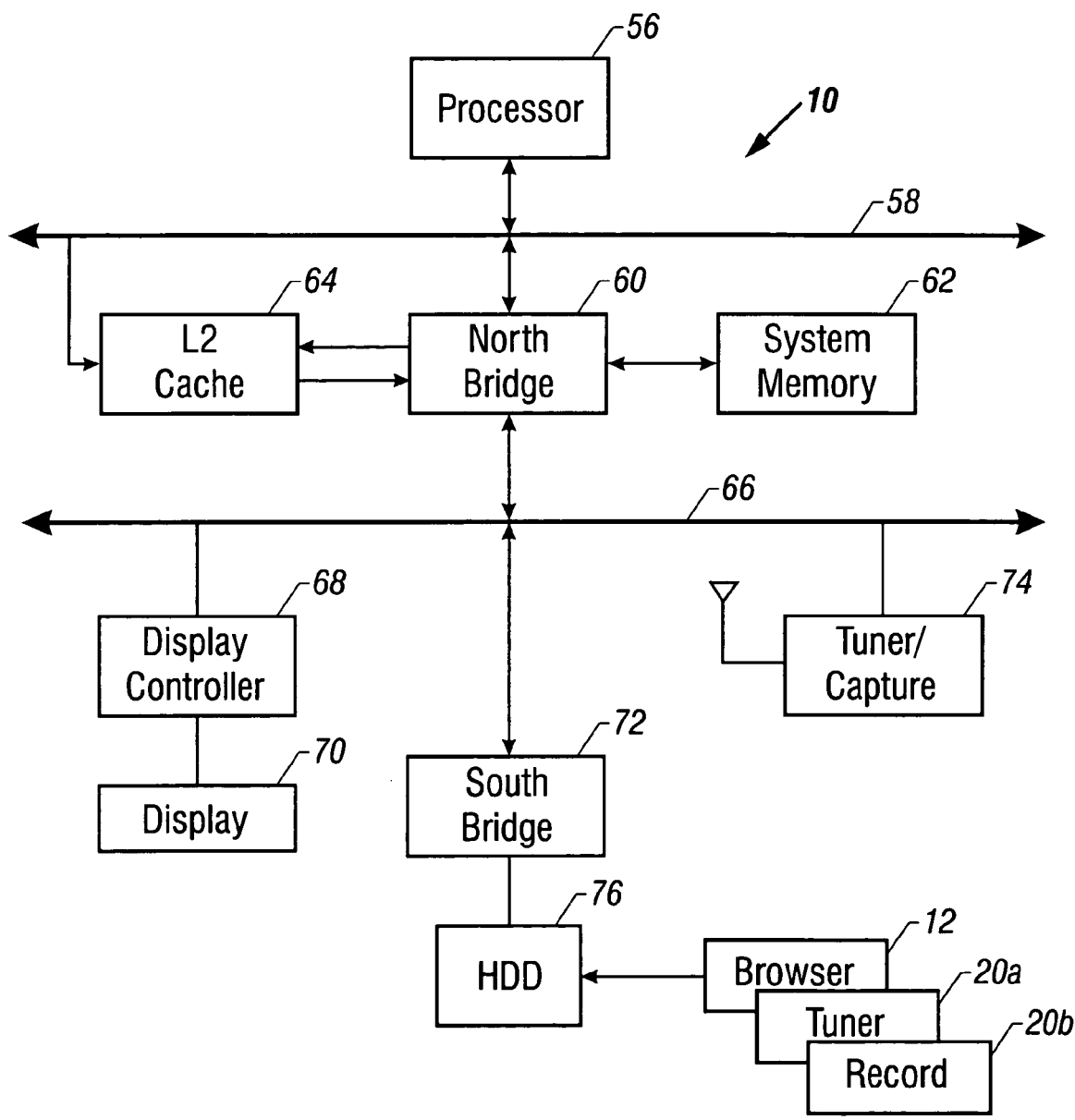
FIG. 5 is a block diagram of hardware in accordance with one embodiment of the present invention.

A processor-based system 10, shown in FIG. 5, may include a processor 56 coupled to a bus 58 in accordance with one embodiment of the present invention. The bus 58 may be coupled to a north bridge 60 that also couples system memory 62 and an L2 cache 64. The north bridge 60 is in turn coupled to a bus 66. The bus 66 is coupled to a display controller 68 and a display 70 such as a television receiver that displays the web page 22 shown in FIGS. 2 and 3. The bus 66 is also coupled to a south bridge 72. The south bridge may be coupled to a hard disk drive 76.

A television tuner/capture card 74 may receive analog or digital television telecasts via a source such as an airwave broadcast antenna, a cable connection or a satellite receiver. The tuner/capture card 74 may be controlled by the tuner application 20*a* to tune to a selected channel.

In accordance with one embodiment of the present invention, the browser 12 and various other applications such as an tuner application 20*a* and a record application 20*b* may be stored on the hard disk drive 76. Upon execution, these applications may be transferred to system memory 62.

A user may extract predefined information from web pages and automatically incorporate that information into application software resident on the user's processor-based system. In one embodiment of the present invention, this may be accomplished by two mouse clicks.

Figure 6:
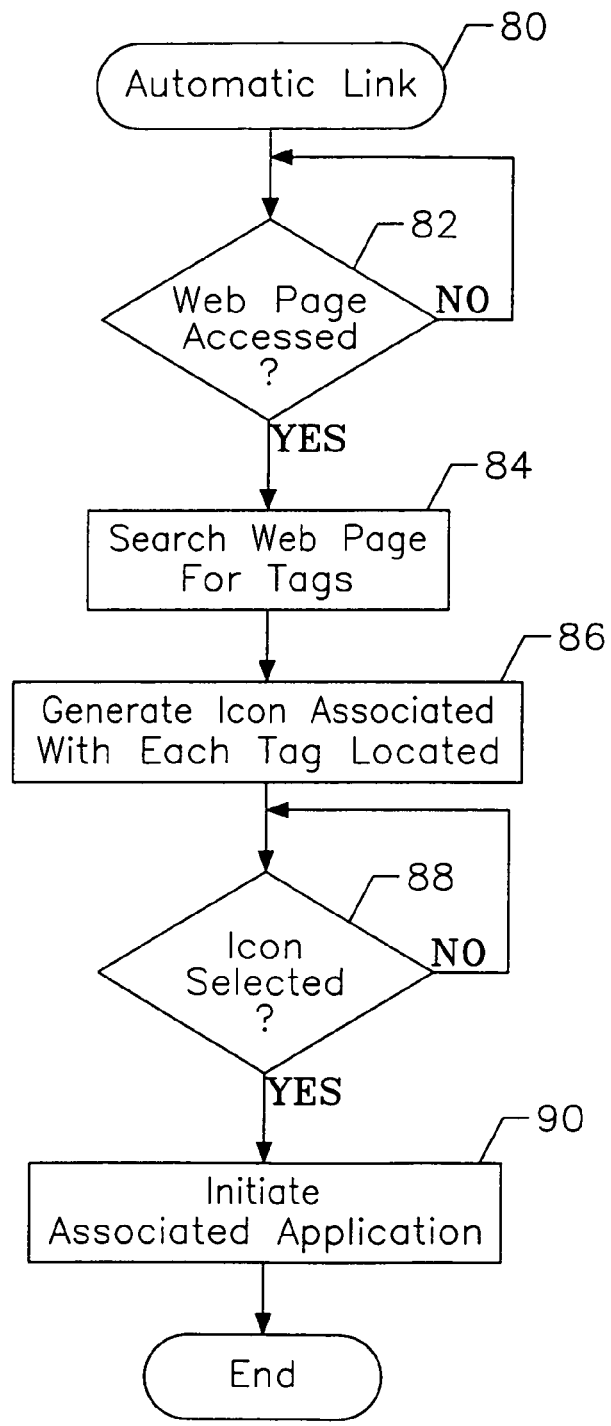
FIG. 6 is a flow chart for another embodiment of the present invention.
Figure 7:
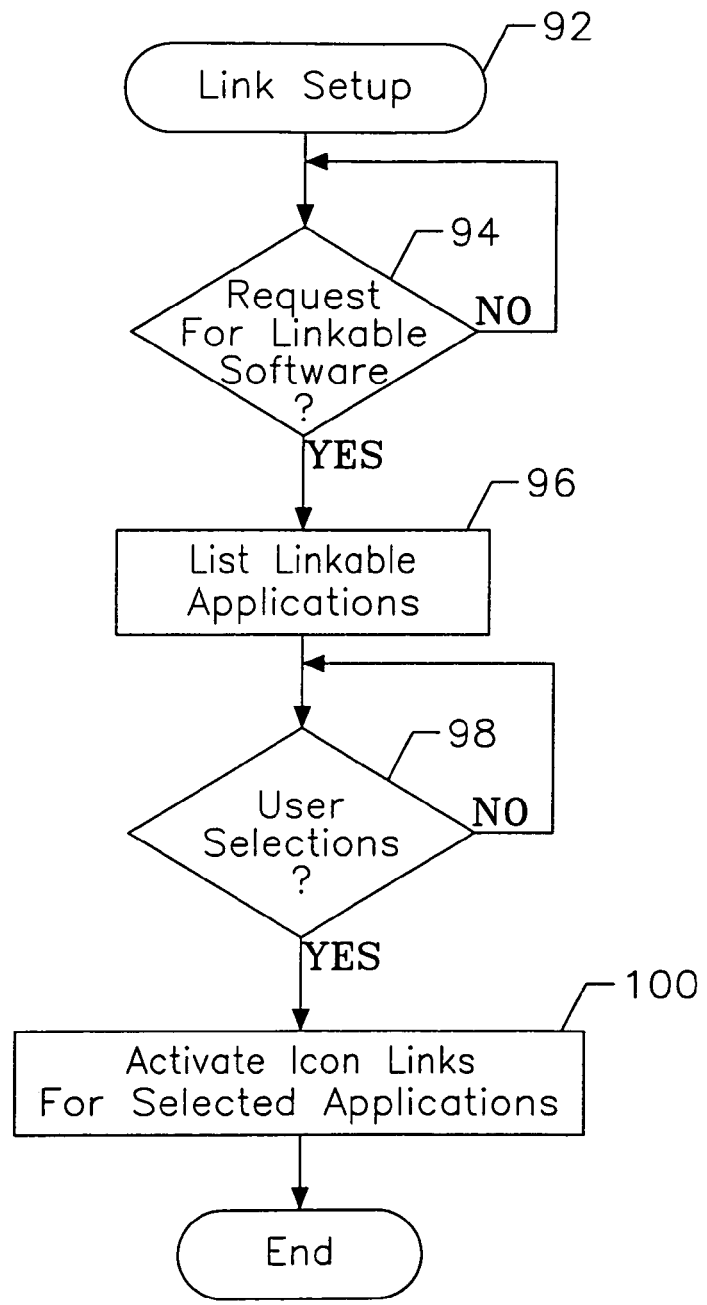
FIG. 7 is a flow chart for the embodiment shown in FIG. 6.
Figure 8:
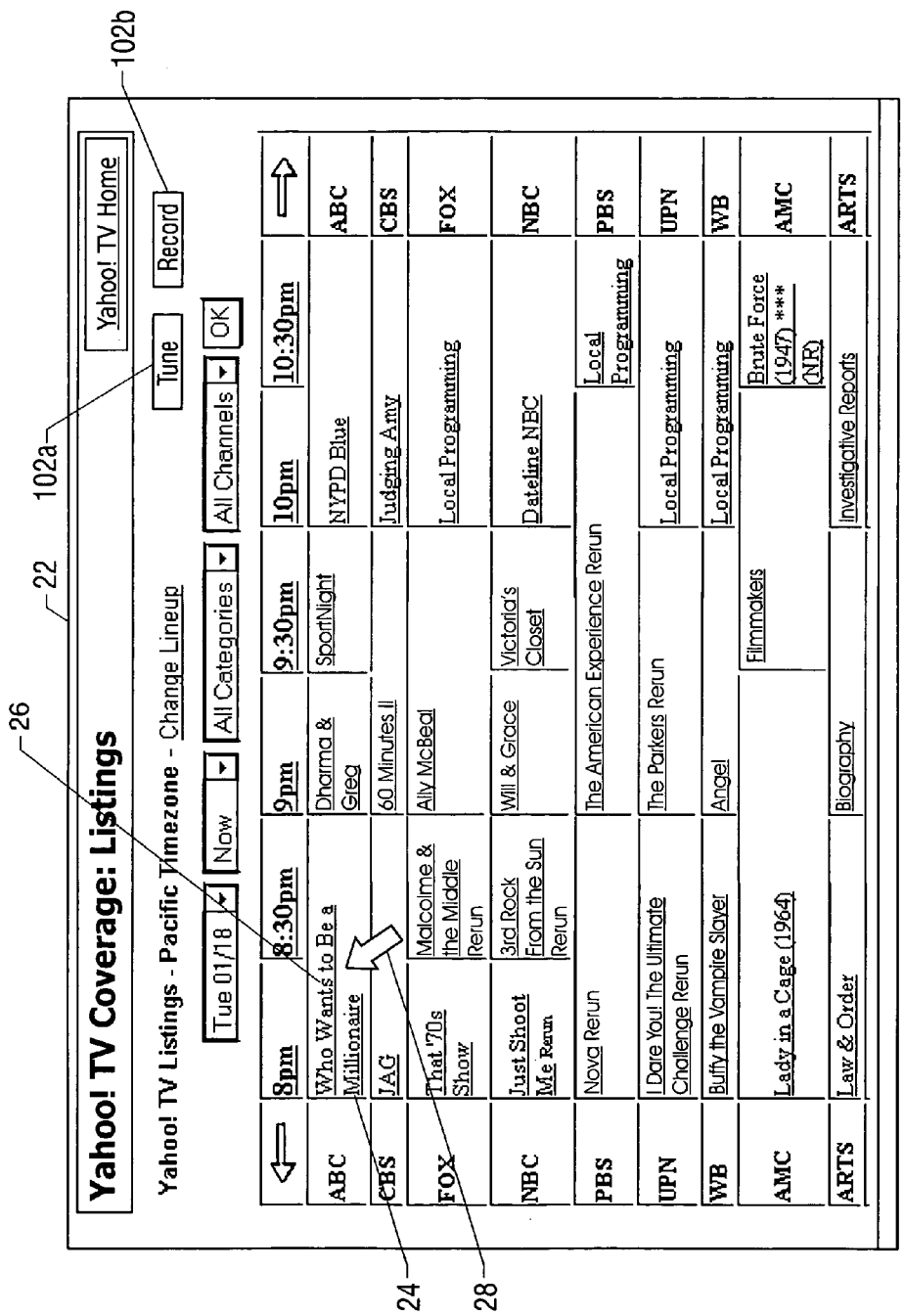
FIG. 8 is a graphical user interface used with one embodiment of the present invention.

In another embodiment of the present invention, illustrated in FIGS. 6 through 8, the software 80 automatically checks any accessed web page to determine whether the web page includes tags that are compatible with specified applications operative on the processor-based system 10. The presence of those tags in an accessed web page may indicated by overlying an indicative icon on the web page.

Thus, referring to FIG. 6, the software 80 determines when a web page has been accessed, as indicated in diamond 82, by a web browser associated with the system 10. When a web page is accessed, it is automatically searched for tags that are compatible with the applications 20 registered with the software 80 as indicated in block 84. If such tags are present, those tags may be utilized to provide information to certain applications resident on the system 10. If such tags are identified, an icon may be automatically generated (block 86) to indicate the compatibility of the web page with one or more software applications resident on the system 10.

Thus, an icon 102 may be displayed over the interface 22, as indicated in FIG. 8, by the software 80. In FIG. 8, an icon 102 indicates that the program information 26 on the interface 22 is in a format which is recognized by an application 20 that has registered with the software 80.

If the user selects an icon 102, as indicated in diamond 88 in FIG. 6, the associated application is automatically started (block 90). Thus, in one embodiment of the present invention, if the user mouse clicks on the tuner icon 102*a* (FIG. 8), the tuner application 20*a* is automatically launched and the channel and time information associated with the tags in the web page are automatically used to tune a television receiver to the selected program.

Link set-up software 92, shown in FIG. 7, may be utilized to register certain applications on the system 54 with the software 80 (FIG. 6). The user may request an identification of linkable software, as indicated in diamond 94. The user may then be provided with a list of applications currently resident on the user system 54 that work with code forming a given web page as indicated at block 96. Each of those applications may include a code which identifies, to the software 92, that the application is compatible with the software 80. The list may be provided as a graphical user interface listing the linkable applications.

As indicated in diamond 98, a check determines whether the user has selected any of the applications to register them with the automatic link software 80. If so, the icon links for selected applications are automatically activated as indicated in block 100. This means that any accessed web page is automatically searched for tags that are compatible with the activated icon links for the selected application.

Thus, in the example shown in FIG. 8, the tuner application 20a has registered with the software 80. As a result, each web page is automatically searched for tags that are compatible with the tuner application 20a. When those tags are located, the tuner icon 102a and the record icon 120b are automatically displayed as overlays on the web page 22. If the user mouse clicks on an icon 102, the application 20a or 20b may be automatically launched and the data in hypertext element marked by the tags may be used to tune to or record the selected program.

Using embodiments of the present invention, information in hypertext elements that are not hyperlinked to an application may be linked to the application. This may be done without coding hyperlinks into the hypertext document. Information may then be extracted from the hypertext element for use in an application.

In addition to extracting data from HTML elements in a hypertext document, the application 20a or 20b may identify a packet identifier (PID) in conjunction with a digital television system. See ATSC Digital Television Standard, (Doc. A/53) Sep. 16, 1995, by the Advanced Television Systems Committee. The PID may be utilized to automatically identify a channel within information transmitted in accordance with an appropriate digital standard. Having obtained this information, the tuner application 20a, for example, may use the PID information to select and tune to the desired digital channel.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
in response to user selection on a computer of a television program entry displayed in a web page, and separately from execution of the markup language itself, automatically locating non-command data within markup language, for said web page, that identifies a television channel to said television program;
parsing said data from said markup language; and
using a software program on said computer to automatically tune to said channel using said data without any user action after selection of said entry displayed in a web page, all without executing the markup language itself.

2. The method of claim 1 wherein automatically locating includes identifying a variable associated with a particular type of hypertext element.

3. The method of claim 2 including automatically locating the hypertext element in response to an indication provided on a screen display of the hypertext document.

4. The method of claim 3 including automatically locating the hypertext element in response to a mouse click.

5. The method of claim 3 wherein automatically locating the hypertext element includes searching for a variable associated with a particular type of hypertext element.

6. The method of claim 5 wherein automatically locating a hypertext element includes automatically locating a variable within a hypertext document associated with an application.

7. The method of claim 1 including causing a first application to automatically register with a browser to enable said first application to extract hypertext elements from web pages displayed by said browser.

8. The method of claim 1 further including automatically providing a user selectable icon in response to locating said data.

9. The method of claim 8 wherein automatically providing an icon includes providing a pop-up menu screen.

10. The method of claim 9 including providing a pop-up menu which indicates at least one application that may be initiated using said element.

11. The method of claim 1 including automatically recording said channel using said data.

12. A non-transitory machine-readable medium having instructions that when executed cause the machine to:
in response to user selection on a computer of a television program entry displayed in a web page, and separately from execution of the markup language itself, automatically locating non-command data within markup language, for said web page, that identifies a television channel to said television program;
parsing said data from said markup language; and
using a software program on said computer to automatically tune to said channel using said data, all without executing the markup language itself.

13. The medium of claim 12 further having instructions that when executed cause the machine to identify a variable associated with a particular type of hypertext element.

14. The medium of claim 13 further having instructions that when executed cause the machine to automatically locate said hypertext element in response to an indication provided on a screen display of a hypertext document.

15. The medium of claim 14 further having instructions that when executed cause the machine to automatically locate the hypertext element in response to a mouse click.

16. The medium of claim 14 further having instructions that when executed cause the machine to identify a variable associated with a particular type of hypertext element.

17. The medium of claim 16 further having instructions that when executed cause the machine to automatically locate a variable within a hypertext document associated with an application.

18. The medium of claim 12 further having instructions that when executed cause the machine to automatically register a first application with a browser to enable said first application to extract hypertext elements from web pages displayed by said browser.

19. The medium of claim 12 further having instructions that when executed cause the machine to automatically provide a user selectable icon in response to the location of said element in said document.

20. The medium of claim 19 further having instructions that when executed cause the machine to provide a pop-up menu.

21. The medium of claim 20 further having instructions that when executed cause the machine to provide a pop-up menu which indicates at least one application may be started using said element.

22. The medium of claim 12 further having instructions that when executed cause the machine to tune a television receiver to a particular channel.

23. The medium of claim 22 further having instructions that when executed cause the machine to record said channel.

24. A system comprising:
a processor-based device having a memory, said processor-based device to, in response to user selection on a computer of a television program entry displayed in a web page, and separately from execution of the markup language itself, automatically locate non-command data within markup language, for said web page, that identifies a television channel to said television program, parse said data from said markup language, and use a software program on said computer to automatically tune to said channel using said data, all without executing the markup language itself; and an interface to connect said device to the Internet.

25. The system of claim 24 wherein said software identifies a variable associated with a particular type of hypertext element.

26. The system of claim 24 including a display coupled to said processor-based device.

27. The system of claim 26 including a mouse coupled to said processor-based device, said software automatically locating a hypertext element in response to a mouse click.

28. The system of claim 27 further including a user selectable icon displayed in response to locating said element in said document.

29. The system of claim 24 including a television tuner/capture card coupled to said processor-based device.

30. The method of claim 2 wherein the non-command data.

31. The method of claim 2 further comprising automatically turning to said channel without using hyperlinking.

\* \* \* \* \*